(12) United States Patent
Lueck et al.

(10) Patent No.: US 8,727,626 B2
(45) Date of Patent: May 20, 2014

(54) METHOD AND DEVICE FOR ADJUSTING THE BEARING PLAY IN A CERAMIC HYBRID BEARING

(75) Inventors: Rudolf Lueck, Nuthetal (DE); Anika Schoenicke, Hamburg (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 0 days.

(21) Appl. No.: 13/702,009

(22) PCT Filed: May 31, 2011

(86) PCT No.: PCT/EP2011/058972
§ 371 (c)(1),
(2), (4) Date: Feb. 19, 2013

(87) PCT Pub. No.: WO2011/151339
PCT Pub. Date: Dec. 8, 2011

(65) Prior Publication Data
US 2013/0142467 A1 Jun. 6, 2013

(30) Foreign Application Priority Data

Jun. 4, 2010 (DE) .................. 10 2010 022 643

(51) Int. Cl.
*F16C 25/08* (2006.01)
*H02K 7/09* (2006.01)
*G01P 3/42* (2006.01)
*G01M 13/04* (2006.01)

(52) U.S. Cl.
USPC ........ 384/446; 384/492; 384/907.1; 310/90.5

(58) Field of Classification Search
USPC ......... 384/446, 447, 490, 492, 500, 519, 548, 384/912, 907.1; 310/90.5
See application file for complete search history.

(56) References Cited

U.S. PATENT DOCUMENTS 2,922,681 A * 1/1960 Bayre .................. 384/446
3,011,842 A * 12/1961 Norris ................. 310/90.5
(Continued)

FOREIGN PATENT DOCUMENTS

DE 19938933 4/2001
DE 10136438 3/2002
(Continued)

OTHER PUBLICATIONS

German Search Report dated Feb. 8, 2011 from counterpart application.

(Continued)

*Primary Examiner* — Marcus Charles
(74) *Attorney, Agent, or Firm* — Timothy J. Klima; Shuttleworth & Ingersoll, PLC

(57) ABSTRACT

A method and a device for adapting a bearing clearance in a ceramic-hybrid bearing having rolling elements in the form of balls or rollers made from a ceramic material and an outer and an inner bearing shell made from ferromagnetic material. In order to be in a position to adapt the bearing clearance also during operation, a magnetic flux is introduced into an outer side of the stationary, non-rotating bearing shell and exits again at the opposite outer side of the bearing shell, with a magnetic field and an associated magnetic flux being generated, and that a deformation of the bearing shell in the sense of a decrease or increase in the circumference of the bearing shell is brought about due to the resulting magnetostrictive effect from a change in the magnetic flux.

19 Claims, 4 Drawing Sheets

(56) References Cited

U.S. PATENT DOCUMENTS

Figure 1:
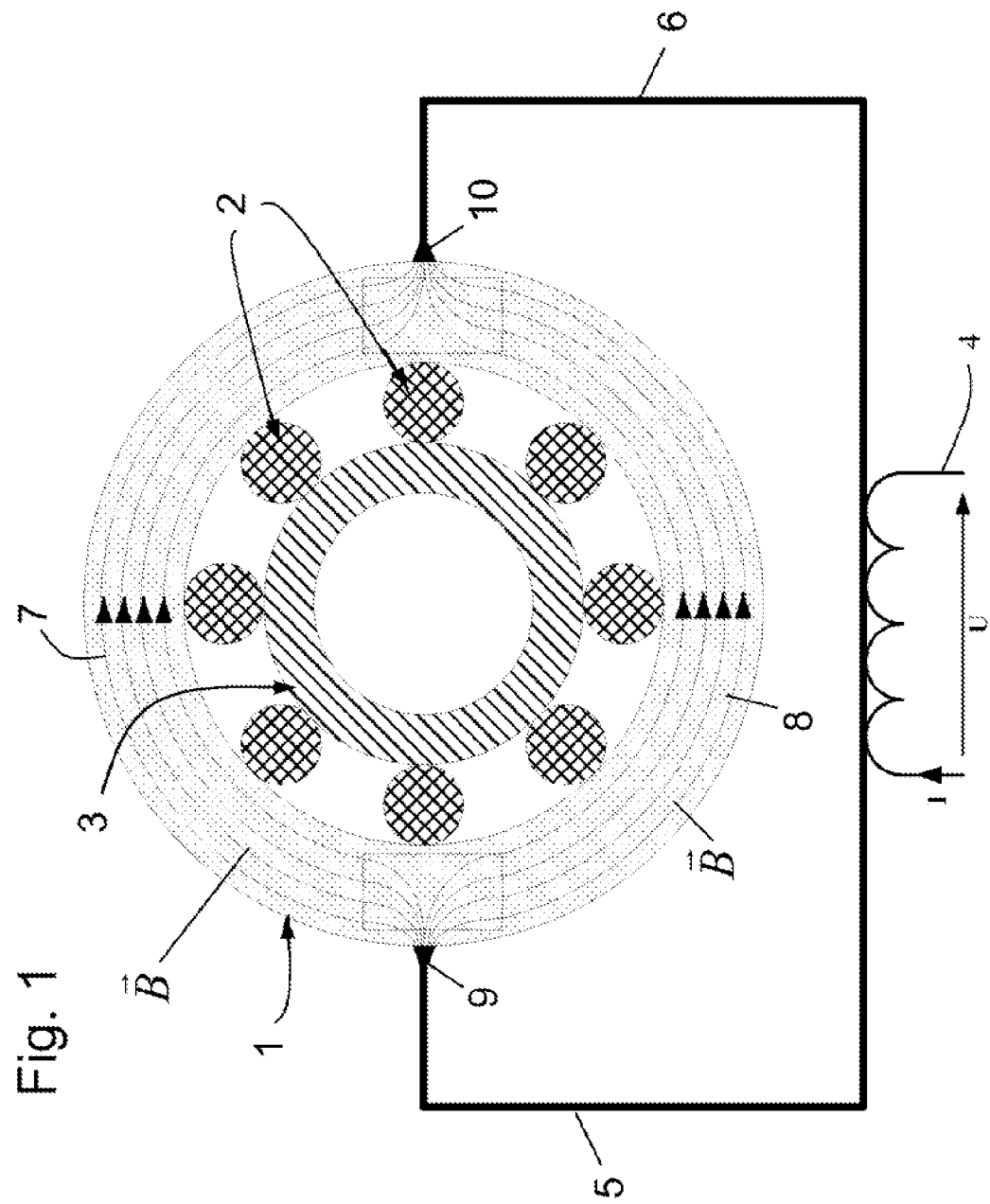

| | | | | |
|---|---|---|---|---|
| 3,016,274 A | * | 1/1962 | Norris | 384/446 |
| 3,746,407 A | * | 7/1973 | Stiles et al. | 384/133 |
| 3,977,739 A | * | 8/1976 | Moskowitz et al. | 384/446 |
| 4,898,480 A | * | 2/1990 | Raj et al. | 384/446 |
| 5,221,146 A | * | 6/1993 | Maruyama | 384/448 |
| 5,397,183 A | * | 3/1995 | Lu et al. | 384/448 |
| 5,524,499 A | * | 6/1996 | Joffe | 74/89.36 |
| 5,564,840 A | * | 10/1996 | Jurras et al. | 29/898.09 |
| 6,508,592 B1 | | 1/2003 | Perni et al. | |
| 7,458,722 B2 | * | 12/2008 | Chen et al. | 384/446 |
| 7,520,675 B2 | * | 4/2009 | Ihata et al. | 384/446 |
| 7,654,746 B2 | | 2/2010 | Ladra et al. | |
| 2002/0044704 A1 | * | 4/2002 | Obara | 384/492 |
| 2006/0023985 A1 | | 2/2006 | Gradu et al. | |
| 2006/0029318 A1 | * | 2/2006 | Beer et al. | 384/569 |
| 2009/0285512 A1 | | 11/2009 | Gebert | |

FOREIGN PATENT DOCUMENTS

| | | | | |
|---|---|---|---|---|
| DE | 10 2004 042 316 | | 3/2006 | |
| EP | 1134443 | | 9/2001 | |
| EP | 1522736 | | 4/2005 | |
| EP | 1635079 | | 3/2006 | |
| EP | 2110569 | | 10/2009 | |
| EP | 2128465 | | 12/2009 | |
| JP | 08014263 A | * | 1/1996 | F16C 35/02 |
| WO | 01/13010 | | 2/2001 | |

OTHER PUBLICATIONS

PCT Search Report and Written Opinion dated Sep. 9, 2011 from counterpart application.

English translation of International Search Report and Written Opinion from related PCT application.

* cited by examiner

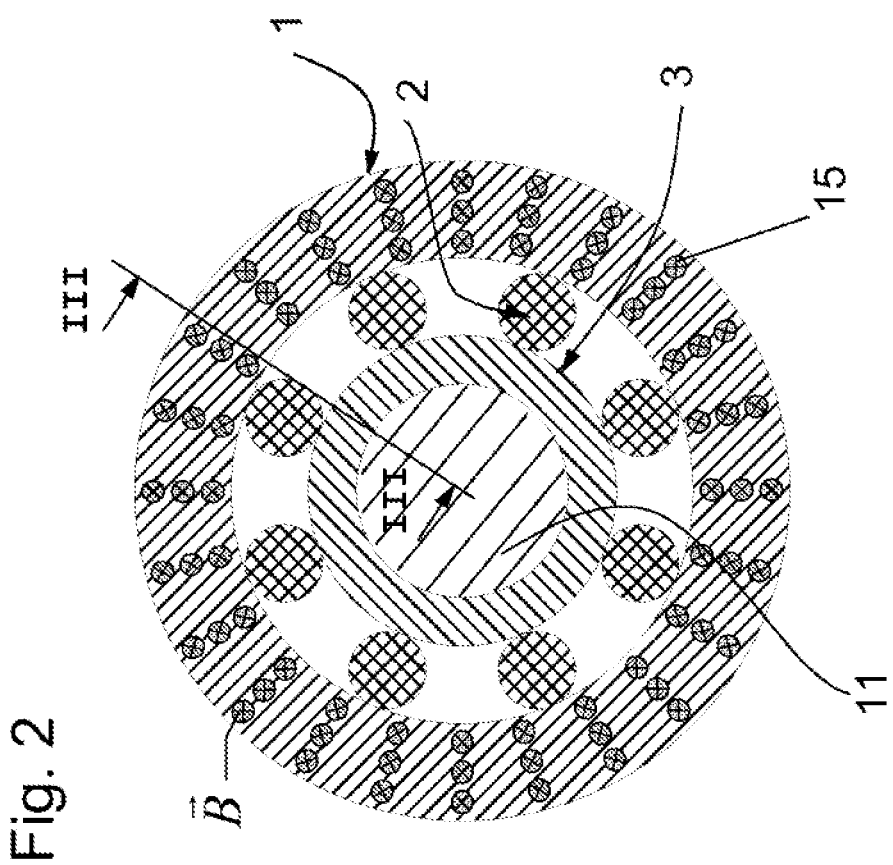

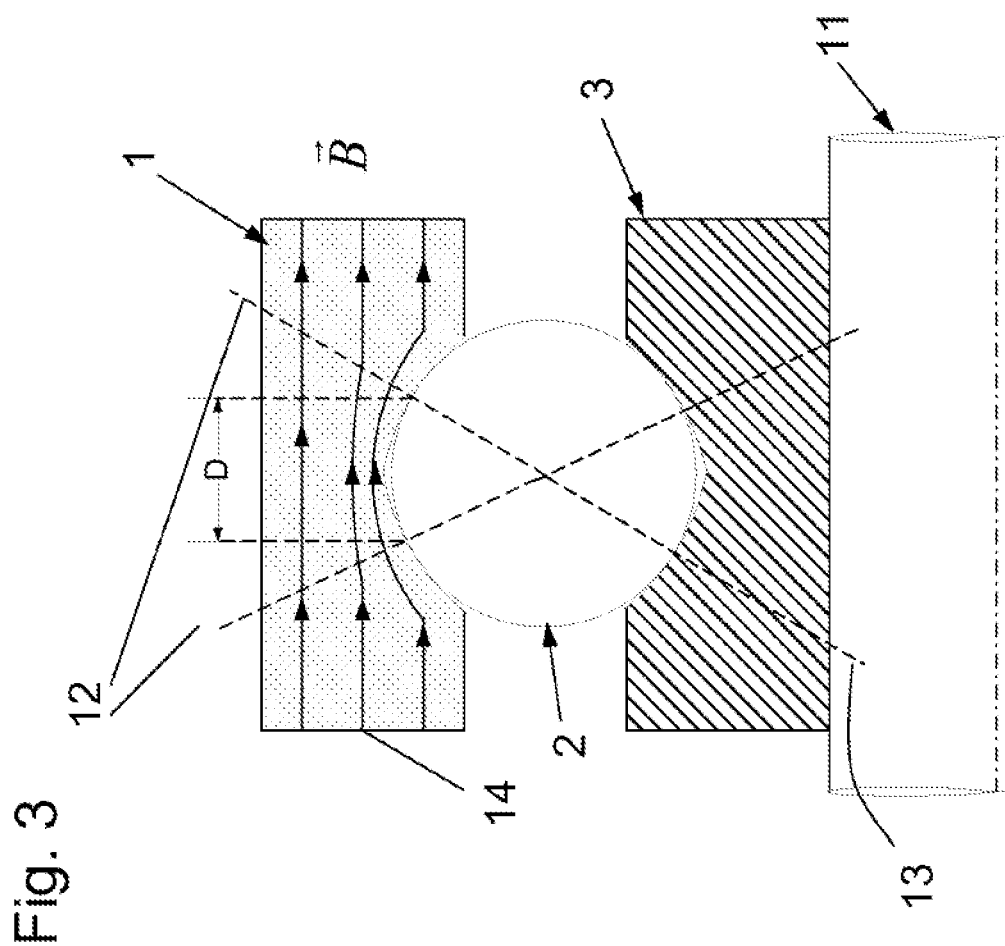

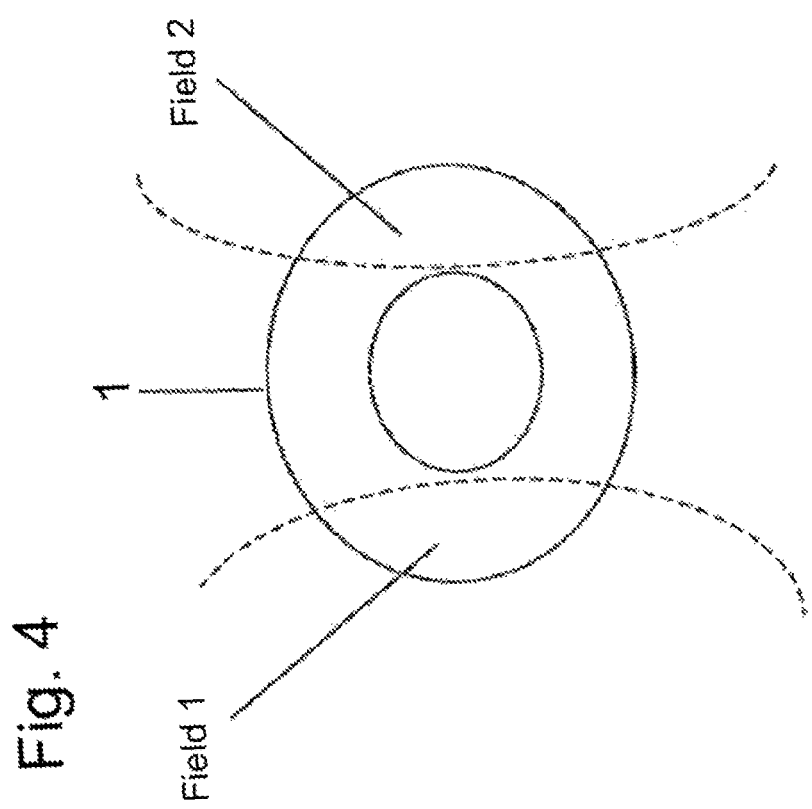

METHOD AND DEVICE FOR ADJUSTING THE BEARING PLAY IN A CERAMIC HYBRID BEARING

This application is the National Phase of International Application PCT/EP2011/058972 filed May 31, 2011 which designated the U.S.

This application claims priority to German Patent Application No. 102010022643.2 filed Jun. 4, 2010 and PCT Application No. PCT/EP2011/058972 filed May 31, 2011, which applications are incorporated by reference herein.

This invention relates to a method and a device for adapting the bearing clearance in a ceramic-hybrid bearing having rolling elements in the form of balls or rollers made from ceramic material and an outer and/or an inner bearing shell made from ferromagnetic material.

Ceramic-hybrid bearings are bearings whose rolling elements in the form of balls or rollers are made from a ceramic material, while their outer and/or inner bearing shell consist(s) of ferromagnetic material, in particular standard bearing steel. To ensure optimum operation of a ceramic-hybrid bearing of this type, a specific and predetermined bearing clearance must always be present.

A device for measuring and adjusting the preload in a bearing is already known from EP 1 134 443 B1 and the parallel specification U.S. Pat. No. 6,508,592 B1. This device serves the purpose of measuring and adjusting the preloading force in a bearing. To do so, two ring elements are connected to one another using piezoelectric or magnetostrictive elements. One of the ring elements presses axially on the outer bearing race and moves the latter into a defined position using a control system with feedback.

A spindle bearing device and a corresponding bearing method are known from DE 10 2004 042 316 A1. The spindle bearing device described here is based on active setting elements. These are piezoelectric or magnetostrictive actuators which force the rotational axis at all times onto the physical principal axis of inertia, to ensure the lowest possible alternating forces acting on the bearing.

An adaptive bearing device is known from US 2006/0023985 A1 which contains a piezoelectric actuator for controlling bearings arranged at a distance from one another and which are in particular angular anti-friction bearings. A piezoelectric actuator is for that purpose positioned next to the outer bearing shell of the bearing such that the outer bearing shell can move parallel to the shaft. Since these are angular anti-friction bearings, the bearing clearance can be changed.

These known devices do not offer the possibility of adapting the bearing clearance during operation.

The object underlying the present invention is therefore to continuously adapt during operation the bearing clearance between the non-rotating bearing shell and the rolling elements in the form of balls or rollers in ceramic-hybrid bearings.

To achieve this object, the invention provides that a magnetic flux is introduced into an outer side of the stationary bearing shell and exits again at the radially opposite outer side of the bearing shell, with a magnetic field and an associated magnetic flux being generated, and that a deformation of the bearing shell in the sense of a decrease or increase in the circumference of the bearing shell is brought about due to the resulting magnetostrictive effect from a change in the magnetic flux. In accordance with the invention, the bearing clearance in ceramic-hybrid bearings between the non-rotating bearing shell and the rolling elements in the form of balls or rollers can thus be continuously adapted during operation.

The non-rotating bearing shell and the non-rotating bearing race, respectively, consist of a ferromagnetic material through which a magnetic flux is passed. Due to the magnetostrictive effect, it is possible by a change in the magnetic flux to bring about a deformation of the bearing shell or of the bearing race, i.e. a decrease or increase in its circumference. The required bearing clearance can thus be set.

The magnetostrictive effect describes the behaviour of the ferromagnetic material of the non-rotating bearing shell subjected to a magnetic flux. The so-called Weiss fields align in the direction of the magnetic flux when the magnetic field is applied or changed. This leads to a length change of the ferromagnetic material which is dependent on the strength of the magnetic field.

The invention deals with the bearing clearance adaptation in a ceramic-hybrid bearing with a ferromagnetic bearing shell and a ceramic rolling element in the form of balls or rollers. In the case of bearing balls it must be taken into account that they have contact lines only in the circumferential direction of the bearing shells. Depending on the bearing design, there are three or four contact lines.

In anti-friction bearings, magnetostriction is also always applied to the stationary bearing shell, i.e. in the case of an inner bearing shell seated on the rotating shaft to the outer bearing shell, and in the case of an outer bearing shell seated inside a rotating shaft to the stationary inner bearing shell.

The present invention presents as examples two embodiments which describe the course of the magnetic flux in the bearing.

In the first embodiment, the magnetic flux is introduced radially to the bearing shell and encloses the latter from two sides in the circumferential direction, i.e. the magnetic flux is introduced at one side of the outer bearing shell and exits again at the radially opposite side of the bearing shell or shaft. A magnetic field and a corresponding magnetic flux are formed, with the latter—split into two magnetic fluxes—enclosing the bearing shell or bearing race from two sides.

In the second embodiment, the magnetic flux is introduced axially to the bearing shell and penetrates the bearing shell axially. This provides the possibility, when balls are used in the bearing, to introduce a magnetic flux axially to the bearing race. Depending on its strength when introduced, the magnetic flux leads to a widening or narrowing of the bearing shell profile and thus also results, by the change of the support points or contact lines of the balls, in a change of the bearing clearance.

In the same way, it is possible by magnetostrictive actuation to apply a cyclic adjustment to the bearing shell, in particular to the stationary bearing race of the bearing, by introducing a vibration into the bearing in order to permit acoustic testing of the ceramic balls or rollers in this way. Here the bearing race is opened to the maximum and tuned with cyclic excitation signals using typical test frequencies of the balls. The balls on top in the bearing race are tested here, which in this situation must be largely load-free.

The invention thus permits continuous adjustment of the bearing clearance. This allows more stable operating points to be attained, for example three-point contact in ball bearings, prevention of edge loading and the like. Unfavourable pressure conditions and hence also loss-inducing friction can be prevented as effectively as possible. Effects related to temperature, load or wear can be compensated for. Checking of the ceramic balls for major faults is performed when the engine is at standstill.

By means of the method in accordance with the invention, checking of the ceramic balls for major damage is possible. Vibration insulation of the shaft mounted in the bearing is also possible by a cyclic and opposite-phase adjustment of two opposite sides of the bearing races.

The invention is explained in more detail in the following on the basis of three embodiments of the device in accordance with the invention for adapting the bearing clearance by magnetostriction in a ceramic-hybrid bearing with balls made from ceramic material and with inner and/or outer bearing shells made from a ferromagnetic material.

FIG. 1 shows the plan view of a ceramic-hybrid bearing with a device for adjusting the bearing clearance by magnetostriction in the first embodiment, FIG. 2 shows the plan view of a ceramic-hybrid bearing with a device for adjusting the bearing clearance by magnetostriction in the second embodiment, FIG. 3 shows a section along line III-III in FIG. 2, and FIG. 4 shows a schematic representation of the third embodiment.

The ceramic-hybrid bearing shown in FIG. 1 in plan view includes, in accordance with the first embodiment of the invention, an outer bearing shell 1 (outer race of bearing) of ferromagnetic material, in particular steel, rigidly mounted in a casing, not shown, a plurality of ceramic balls 2 acting as rolling elements, and an inner bearing shell 3 (inner race of bearing) of ferromagnetic material, in particular steel, rotating with a shaft, not shown. The balls 2 of the bearing have—as will be explained in greater detail on the basis of FIG. 3—contact lines only in the circumferential direction of both bearing shells 1, 3.

Via coil 4 whose voltage and current paths U and I, respectively, are shown and which is connected to the outer circumference of the outer bearing shell 1 by magnetic paths 5, 6 at radially opposite points, a magnetic field B is generated in the outer bearing shell 1 which passes inside the outer bearing shell 1 as a magnetic flux in accordance with the arrows 7, 8 from the connection point 9 of the path 5 on the left-hand side in FIG. 1 of the outer bearing shell 1 to the connection point 10 of the path 6 on the right-hand side in FIG. 1 of the outer bearing shell 1. The magnetic flux flowing in accordance with the arrows 7, 8 is thus introduced at one side of the outer bearing shell 1 and exits again at the opposite side of the outer bearing shell 1 and hence of the shaft, not shown. In this way, the magnetic field B and a corresponding magnetic flux form in accordance with the arrows 7, 8, the latter being split into two magnetic fluxes and enclosing the outer bearing shell 1 from two sides.

Due to the magnetostrictive effect resulting from the magnetic flux B, it is possible by a change in the magnetic flux B to bring about a deformation of the inner circumference of the outer bearing shell 1 (outer race of bearing) and hence a decrease or increase in the diameter of the contact lines of the balls 2. The required bearing clearance can thus be set.

The magnetostrictive effect describes the behaviour of a ferromagnetic material subjected to a magnetic flux. The so-called Weiss fields align in the direction of the magnetic flux when the magnetic field is applied or changed. This leads to a length change of the ferromagnetic material which is dependent on the strength of the magnetic field B.

The ceramic-hybrid bearing shown in FIG. 2 in a plan view and in FIG. 3 in a section along the line III-III in FIG. 2 in accordance with the second embodiment of the invention includes in turn an outer bearing shell 1 (outer race of bearing) of ferromagnetic material, in particular steel, rigidly mounted in a casing, not shown, a plurality of ceramic balls 2 acting as rolling elements, and an inner bearing shell 3 (inner race of bearing) of ferromagnetic material, in particular steel, rotating with a shaft 11. The balls 2 of the bearing have, in their design as a four-point support, two contact lines 12, 13 each in the circumferential direction of the two bearing shells 1, 3, both with the outer bearing shell 1 and with the inner bearing shell 3. Designs as three-point supports are also possible. The activated bearing race must then include the two-point support.

Unlike in the first embodiment shown in FIG. 1, in the second embodiment the magnetic flux B in accordance with the arrows 14 in FIG. 3 and the crossed circles 15 in FIG. 2 is introduced axially to the outer bearing shell 1, for which coils and lines, not shown, are used similarly to the first embodiment. The magnetic flux leads—depending on the strength introduced—to a widening or narrowing of the profile of the outer bearing shell 1 and thus also results, by a change of the support points or contact lines 12 of the balls 2 in a change of the bearing clearance. This is shown in FIG. 3 by the illustration of the width D between the contact lines 14 of the balls 2. By a change in the width D, the support surface of the balls 2 and hence the resultant diameter of the outer bearing shell 1 (outer race of bearing) is adjusted, and hence the bearing clearance.

As already set forth regarding the first embodiment in accordance with FIG. 1, it is possible due to the magnetostrictive effect resulting from the magnetic flux B to bring about a deformation of the inner circumference of the outer bearing shell 1 (outer race of bearing) and hence a decrease or increase in the diameter of the contact lines 14 of the balls or of the width D between the contact lines 14 by a change in the magnetic flux B. The required bearing clearance can thus be set.

The magnetostrictive effect was already explained in connection with the first embodiment according to FIG. 1.

Furthermore, a cyclic adjustment of respectively opposite bearing shell areas is conceivable with the invention, for example in the case of a transverse entry of the field lines into the bearing shell 1 as shown in FIGS. 2 and 3. This permits vibration insulation of the mounted shaft, i.e. vibrations introduced via the rotor shaft can thus be reduced in the amplitude. The mounting becomes "softer" by actuation in the phase with vibration.

This is implemented technically in that—as shown in FIG. 4—field 1 and field 2 are generated by separate coils each. The magnetic fields or the magnetic flux are introduced alternately, in the manner that the centre point of the bearing shifts cyclically with this type of actuation. The characteristics of the magnetic fields, i.e. field 1 and field 2 in FIG. 4, on the opposite sides of the bearing shell 1 must be designed with regard to their geometry and strength such that the bearing shell 1 always retains its circular form.

LIST OF REFERENCE NUMERALS

1 Outer bearing shell (outer race of bearing)
2 Ball
3 Inner bearing shell (inner race of bearing)
4 Coil
5 magnetic path
6 magnetic path
7 Arrow (magnetic flux)
8 Arrow (magnetic flux)
9 Connection point
10 Connection point
11 Shaft
12 Contact line
13 Contact line
14 Arrow (magnetic flux)
15 Crossed circle (magnetic flux)

What is claimed is:

1. A method for adapting a bearing clearance in a ceramic-hybrid bearing having rolling elements in the form of balls or rollers made from a ceramic material and an outer and an inner bearing shell made from ferromagnetic material, comprising;

introducing a magnetic flux into an outer side of the stationary, non-rotating bearing shell and exiting the magnetic flux at an opposite outer side of the bearing shell, to generate a magnetic field and an associated magnetic flux, and decrease or increase a circumference of the bearing shell due to a resulting magnetostrictive effect from a change in the magnetic flux.

2. The method in accordance with claim 1, wherein the magnetic flux is introduced radially to the bearing shell and encloses the bearing shell from two sides in a circumferential direction.

3. The method in accordance with claim 2, and further comprising using an electric coil for creating the magnetic flux.

4. The method in accordance with claim 1, wherein the magnetic flux is introduced axially to the bearing shell and penetrates the bearing shell axially.

5. The method in accordance with claim 4, and further comprising using an electric coil for creating the magnetic flux.

6. The method in accordance with claim 1, wherein the magnetostrictive effect and change in the magnetic flux is cyclically applied to the bearing shell to introduce into the bearing at least one chosen from a cyclic adjustment of the circumference of the bearing shell and a vibration.

7. The method in accordance with claim 6, and further comprising using an electric coil for creating the magnetic flux.

8. The method in accordance with claim 6, and further comprising using two electric coils for creating separate magnetic fields at the opposite sides of the bearing shell to cyclically apply the magnetostrictive effect and change in the magnetic flux.

9. The method in accordance with claim 1, and further comprising using an electric coil for creating the magnetic flux.

10. A device for adapting a bearing clearance in a ceramic-hybrid bearing having rolling elements in the form of balls or rollers made from a ceramic material and an outer and an inner bearing shell made from ferromagnetic material, comprising;

a device for introducing a magnetic flux into an outer side of the stationary, non-rotating bearing shell and exiting the magnetic flux at an opposite outer side of the bearing shell, to generate a magnetic field and an associated magnetic flux, and decrease or increase a circumference of the bearing shell due to a resulting magnetostrictive effect from a change in the magnetic flux.

11. The device in accordance with claim 10, wherein the device for introducing the magnetic flux is associated with the bearing shell to introduce the magnetic flux radially to the bearing shell and enclose the bearing shell from two sides in a circumferential direction.

12. The device in accordance with claim 11, wherein the device for introducing the magnetic flux includes an electric coil for creating the magnetic flux.

13. The device in accordance with claim 10, wherein the device for introducing the magnetic flux is associated with the bearing shell to introduce the magnetic flux axially to the bearing shell and penetrate the bearing shell axially.

14. The device in accordance with claim 13, wherein the device for introducing the magnetic flux includes an electric coil for creating the magnetic flux.

15. The device in accordance with claim 10, wherein the device for introducing the magnetic flux applies the magnetostrictive effect, and change in the magnetic flux cyclically to the bearing shell to introduce into the bearing at least one chosen from a cyclic adjustment of the circumference of the bearing shell and a vibration.

16. The device in accordance with claim 15, wherein the device for introducing the magnetic flux includes an electric coil for creating the magnetic flux.

17. The device in accordance with claim 16, wherein the device for introducing the magnetic flux includes two electric coils for creating separate magnetic fields at the opposite sides of the bearing shell to cyclically apply the magnetostrictive effect and change in the magnetic flux.

18. The device in accordance with claim 15, wherein the device for introducing the magnetic flux includes two electric coils for creating separate magnetic fields at the opposite sides of the bearing shell to cyclically apply the magnetostrictive effect and change in the magnetic flux.

19. The device in accordance with claim 10, wherein the device for introducing the magnetic flux includes an electric coil for creating the magnetic flux.

* * * * *